United States Patent [19]

Freeman

[11] 4,167,966
[45] Sep. 18, 1979

[54] AIR CONDITIONER BLOWER CONTROL

[76] Inventor: Edward M. Freeman, 3214 Leyte Dr., San Antonio, Tex. 78217

[21] Appl. No.: 810,052

[22] Filed: Jun. 27, 1977

[51] Int. Cl.² ............................................. F25B 13/00
[52] U.S. Cl. ....................................... 165/2; 62/180; 165/27; 236/DIG. 9
[58] Field of Search .................... 62/180, 186; 236/11, 236/DIG. 9; 165/26, 27, 2

[56] References Cited

U.S. PATENT DOCUMENTS

| | | | |
|---|---|---|---|
| 3,070,972 | 1/1963 | Atchison | 62/180 |
| 3,454,078 | 7/1969 | Elwart | 165/27 |
| 3,785,433 | 1/1974 | Ballard | 165/27 |
| 3,877,243 | 4/1975 | Kramer | 62/180 |

*Primary Examiner*—Albert W. Davis, Jr.
*Assistant Examiner*—Margaret A. Focarino

[57] ABSTRACT

A control circuit for a typical home heating and cooling system is shown. The control circuit includes a standard 24 volt transformer in conjunction with a thermostat selector switch and a fan selector switch. As is common in many heating and cooling systems, a multiple speed blower is included with the higher speed being used during the cooling cycle. In addition to the standard relay for normal operation of the multiple speed blower motor in the typical home heating and cooling system, the control circuit includes an economizer control relay. The economizer control relay activates when the thermostat selector switch is in the cool position and the fan selector switch is ON to cause the blower motor to run at a high speed while the compressor is running and at a low speed while the compressor is not running.

5 Claims, 1 Drawing Figure

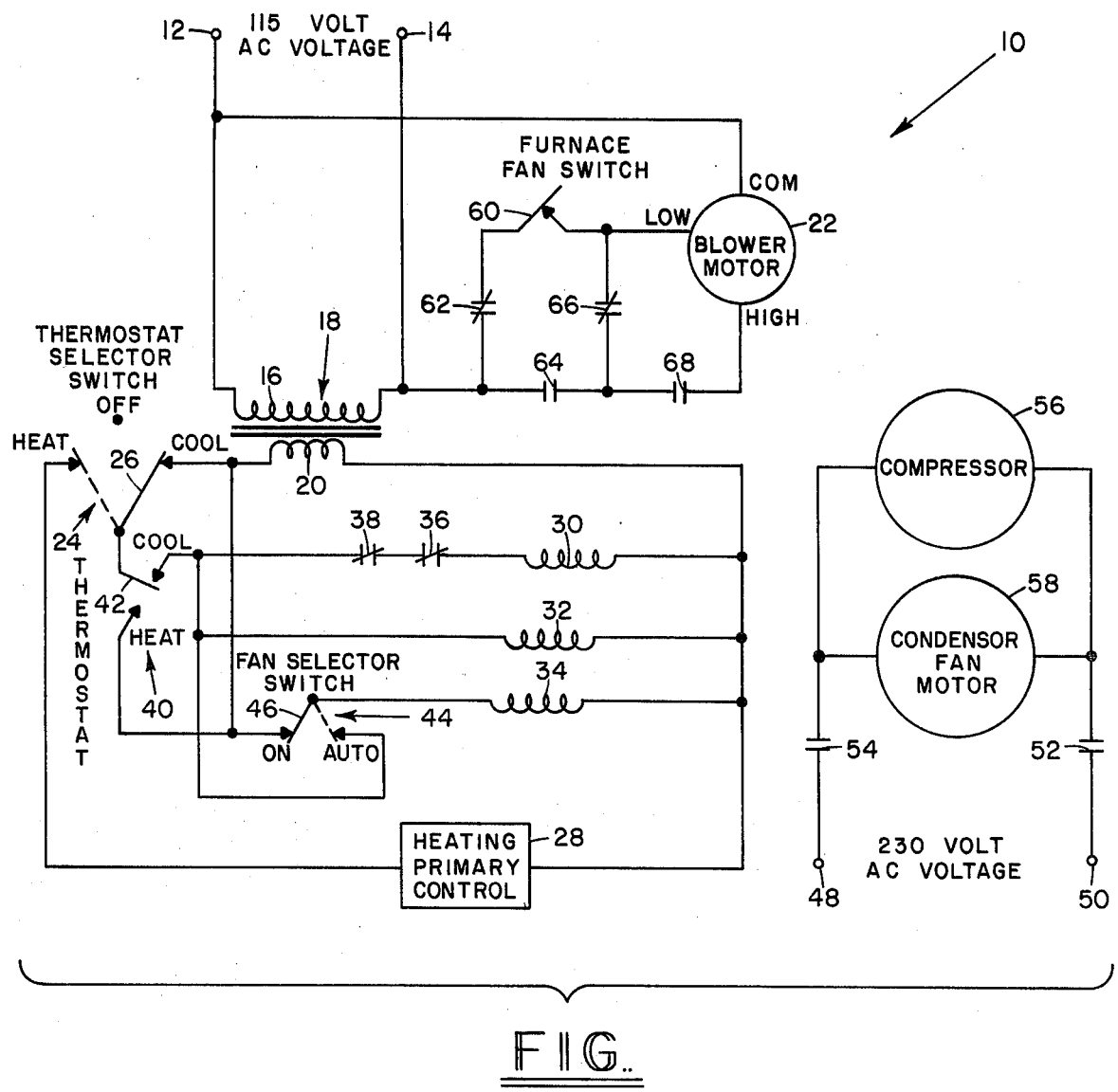
FIG.

AIR CONDITIONER BLOWER CONTROL

BACKGROUND OF THE INVENTION

This invention relates to a control circuit for a home heating and air conditioning system and, more particularly, to provide multiple speed capability to the home heating and cooling unit with a significant savings in energy during the cooling season.

DESCRIPTION OF THE PRIOR ART

In the past, home heating and cooling systems have had one centralized control unit with a thermostat selector switch that may be positioned in the heat, cool or OFF position. Also, a fan selector switch is normally located in the centralized control unit with the fan either being turned to the automatic position or to the ON position. The thermostat, which normally indicates if either heating or cooling is necessary, is normally located within the centralized control unit. During the heating season, if the fan selector switch is on automatic, the evaporator fan relay causes the blower to operate at a lower speed during the heating cycle. During the cooling season, if the thermostat selector switch is in the cool position and the fan selector switch is in the automatic position, upon the thermostat calling for cooling, an evaporative fan relay is activated to switch the multiple speed blower motor to a high speed. This allows for maximum heat transfer from the evaporator coils to the cooled space due to the large volume of air flow over the evaporator coils during the operation of the compressor. If the fan selector switch is in the ON position when the thermostat selector switch is in either the heat or the cool position, then the multiple speed blower motor will continue to operate at high speed regardless of whether or not the thermostat is calling for heat or cooling.

In U.S. Pat. No. 3,454,078 issued to Elwart, there is shown a blower motor that may be operated over an infinite range of speeds. However, to operate the blower motor, a diac and triac combination is used to vary the speed of a split phase motor. There is a considerable amount of energy loss in the triac requiring special heat sinks. Heat sinks are also required for the blower motor because a true sign wave is not being fed to the windings. This results in a large amount of total energy loss, even though the blower motor may be operated over a wide range of speeds. Motors other than split phase motors having either a shaded pole or capacitor run will have a tendency to burn up during repeated operation. Further, Elwart is dependent upon the accuracy of thermistors, as well as a photocell operated by a low voltage lamp. If the blower in Elwart is operated at any speed other than the high speed, there will be a large amount of energy loss because the waveform supplied to the blower motor is not true sign waves as would be the case with the present invention. There is no suggestion in Elwart to change the speed of the blower motor during the cooling season with a sinusoidal waveform, which change is dependent upon the position of the thermostat and the operation of the compressor.

SUMMARY OF THE INVENTION

It is an object of the present invention to provide a home heating and cooling system with multiple speed capabilities during the cooling cycle.

It is another object of the present invention to provide a control unit for a home heating and cooling system wherein the blower motor is operated continuously during the cooling season with the blower motor operating at a low speed when the compressor is OFF and at a high speed when the compressor is ON.

It is another object of the present invention to provide an energy saving modification for a home heating and cooling system wherein the blower motor is continuously operated at a low speed when the compressor is OFF thereby providing continued air circulation inside of the cooled area to eliminate hot air pockets and provide continued air circulation. The continued air circulation will result in the body feeling comfortable at a higher temperature due to air circulation over the skin. Therefore, the higher setting of the thermostat results in a decrease in the operation time of the compressor which is the major power consumer in the air conditioning system.

It is even another object of the present invention to modify the control unit of an existing heating and cooling system having a multiple speed blower motor. The existing heating and cooling system would include a thermostat selector switch having a heat, cool and OFF position, a fan selector switch and a thermostat. An economizer control relay is connected through the cool contact of the thermostat and the cool contact of the thermostat selector switch across a 24 volt transformer to energize the economizer control relay. Energization of the economizer control relay will open a normally closed contact connected to the low speed terminal of the multiple speed blower motor, and close a normally opened contact connected to the high speed connection of the multiple speed blower motor. By having the fan selector switch in the ON position, the evaporator fan relay is energized thereby allowing power to be continuously supplied to the normally open and normally closed contacts of the economizer control relay. Therefore, when the thermostat moves to the cool position, the contactor relay is energized to turn ON the compressor, and the economizer control relay will also be activated to switch the multiple speed blower motor from a low speed to a high speed. The normal operation of the heating cycle is not changed.

DESCRIPTION OF THE DRAWING

The FIGURE is a schematic illustration of a control unit for a heating and cooling system embodying the present invention.

DESCRIPTION OF THE SPECIFIC EMBODIMENT

Referring to the drawing, a typical control unit for a home heating and cooling system embodying the present invention is shown. The control unit embodying the present invention is represented generally by reference numeral 10. A 115 volt rms AC voltage is supplied through the input terminals 12 and 14 to the primary winding 16 of a stepped-down transformer 18 with the voltage across the secondary winding 20 typically being 24 volts. Also connected to input terminal 12 is a common lead from multiple speed blower motor 22. High and low speed connections of the multiple speed blower motor 22 connect through relay contacts and a furnace fan switch 60 to input terminal 14 as will be subsequently explained in more detail.

A secondary winding 20 of a transformer 18 connects to the cool contact of a thermostat selector switch 24 having a wiper arm 26. The wiper arm 26 may be manually adjusted from the cool position to a center OFF position or to a heating position. In the heat position, the wiper arm 26 connects to a heating primary control 28. While the heating primary control 28 is not explained in detail herein, it would include the typical elements, such as a pilot light, gas valve, and other related controls not specifically shown herein. The heating primary control 28 connects to the opposite side of the secondary winding 20.

Connected to the same side of the secondary winding 20 as the heating primary control 28 is contactor coil 30, economizer control relay 32 and evaporator fan relay 34. The opposite side of the contactor coil 30 connects through a normally closed, low pressure switch 36 and a normally closed, high pressure switch 38 to the cool contact of the thermostat 40. Thermostat 40 has a wiper arm 42 which may be of the typical bimetal construction. Also connected to the cool contact for the thermostat 40 is one side of economizer control relay 32. The heat contact for thermostat 40 connects directly to one side of the secondary winding 20 of the transformer 18. The ON contact of a fan selector switch 44 also connects to the heat contact of thermostat 40 and the same side of the secondary winding 20. The wiper arm 46 of the fan selector switch 44 may be in the ON or automatic position. The wiper arm 46 of fan selector switch 44 is connected to one side of evaporator fan relay coil 34.

Connected to terminals 48 and 50 is a suitable 230 volt rms AC voltage which is fed to normally open relay contacts 52 and 54 of contactor coil 30. The opposite side of the normally open relay contacts 52 and 54 are connected to each respective side of a parallel connection for a compressor 56 and a condenser fan motor 58.

During the normal operation of the control unit 10 in the heating season, the wiper arm 26 of the thermostat selector switch 24 is in the heat position. If the wiper arm 46 of the fan selector switch 44 is in the automatic position, upon the wiper arm 42 of thermostat 40 moving to the heat position thereby indicating additional heat is necessary, one side of the secondary winding 20 will be connected through the wiper arm 42 of the thermostat 40 and the wiper arm 26 of thermostat selector switch 24 to supply energy to the heating primary control 28. The supplying of voltage to the heating primary control 28 causes the furnace to start the heating process. Once the temperature inside of the furnace has reached a predetermined point, the furnace fan switch 60 will close. Because the evaporator fan relay coil 34 is not energized, 115 volts AC is fed through the normally closed relay contact 62 and the furnace fan relay 60 to the low speed side of blower motor 22 thereby causing the blower motor 22 to operate at a low speed. When the thermostat 40 has sensed that the room temperature is at the desired level, the wiper arm 42 will move to the cool position thereby removing the energy being supplied to the heating primary control 28 to shut OFF the furnace. However, the furnace fan switch 60 will not open until temperature inside of the furnace has decreased below the amount preset in the furnace fan switch 60.

If the wiper arm 46 of the fan selector switch 44 is in the ON position, then the evaporator fan relay coil 34 is energized and opens normally closed relay contact 62 and closes normally open relay contact 64. Since the economizer control relay coil 32 can never be energized when the wiper arm 26 of the thermostat selector switch 24 is in the heat position, 115 volts AC will be supplied between the low speed terminal and common of blower motor 22 via normally open relay contact 64 of evaporator fan relay coil 34 and normally closed relay contact 66 of economizer control relay coil 32. In this case, operation of the furnace fan switch 60 in the thermostat 40 will have no effect on the low speed operation of blower motor 22.

Assume now that the wiper arm 26 of the thermostat selector swtich 24 is in the cool position. If the wiper arm 46 of the fan selector switch 44 is in the automatic position, the evaporator fan coil 34 will be energized upon the wiper arm 42 of the thermostat 40 moving to the cool position. By energization of the evaporator fan relay coil 34, the normally open relay contact 64 would close thereby supplying 115 volts AC through either normally closed relay contact 66 or normally open relay contact 68 of economizer relay coil 32. It should be realized that the furnace fan switch 60 remains open during the entire cooling season.

Since the economizer control relay coil 32 also connects through wiper arm 42 of thermostat 40 when the wiper arm 42 is in the cool position, and the wiper arm 26 of the thermostat selector switch 24 to the secondary winding 20 of the transformer 18, the economizer control relay coil 32 is energized which causes normally closed relay contact 66 to open and normally open relay contact 68 to close. Therefore, each time the evaporator fan relay coil 34 is energized (with the fan selector switch remaining in the automatic position), so is the economizer control relay coil 32 therefore supplying 115 volts AC via normally open relay contacts 64 and 68 to the high speed terminal of multiple speed blower motor 22.

If the refrigerant in the compressor 56 has the necessary charge, normally closed, low pressure switch 36 will remain closed. Also, the normally closed, high pressure switch 38 will remain closed if the compressor 56 is not overcharged, does not overheat or otherwise malfunction causing the switch to open. Therefore, during normal operation, switches 36 and 38 will be closed and contactor coil 30 will be energized upon movement of the wiper arm 42 of thermostat 40 to the cool position if the wiper arm 26 of thermostat selector switch 24 is also in the cool position. Upon the thermostat 40 calling for cooling by movement of wiper arm 42 to the cool position, the contactor coil 30 will be energized and the normally open relay contacts 52 and 54 closed. The closing of the normally open relay contacts 52 and 54 connects the 230 volts received at terminals 48 and 50 across the compressor 56 and the condensor fan motor 58. The position of the fan selector switch 44 has no effect on the operation of the contactor coil 30.

Assume now that the wiper arm 46 of the fan selector switch 44 is moved to the ON position. Evaporator fan relay coil 34 will remain continuously energized thereby opening normally closed relay contact 62 and closing normally open relay contact 64. Therefore, when the wiper arm 42 of thermostat 40 is in the heat position and the wiper arm 26 of the thermostat selector switch 24 is in the cool position, the economizer control relay coil 32 is not energized. When the economizer control relay coil is not energized, 115 volts will be connected to the low speed terminal of multiple speed blower motor 22 via normally closed relay contact 66 and normally open relay contact 64. Upon the wiper arm 42 of the thermostat 40 moving to the cool position indicating cooling is necessary, both the contact coil 30 and the economizer control relay coil 32 are energized. Energization of the economizer control relay coil 32 will open normally closed relay contact 66 and close normally open relay contact 68 thereby applying voltage to the high speed terminal of the multiple speed blower motor 22. Simultaneously, the compressor 56 is energized. Therefore, by inclusion of the economizer control relay 32 with its respective normally closed relay contact 66 and normally open relay contact 68, the multiple speed blower motor 22 is operated at a low speed when cooling is not required and at a high speed when cooling is required. During the heating season, the economizer relay coil 32 and its relay contacts 66 and 68 will have no effect on the normal operation of the heating and cooling system.

By use of the economizer control relay coil 32, the multiple speed blower motor 22 can be continuously operated during the cooling season at a low speed when cooling is not required thereby insuring a continued air circulation in the cooled area. The continued air circulation prevents hot air pockets, and causes individuals located inside the cooled area to sense the moving air over their bodies. The moving air over an individual's body tends to increase the temperature at which an individual is comfortable thereby resulting in high settings for the thermostat 40. Since the compressor 56 is the main source of energy drain, by the decreasing the ON time for the compressor 56 by higher setting of the thermostat 40 results in a substantial energy savings even though the blower motor 22 is continuously operated at a low speed when the compressor 56 is OFF. The multiple speed blower motor 22 must operate at a high speed when the compressor is ON to insure the maximum heat transfer through the evaporator coil (not shown) and the vaporization of the refrigerant contained therein.

I claim:

1. In a home type heating and cooling system having a blower motor with at least two speeds, a common terminal of said blower motor being connected to a first side of a line voltage, stepped-down transformer means for reducing said line voltage to thermostat control means which includes a thermostat selector switch operatively connected to a secondary winding of said stepped-down transformer, a thermostat operatively connected to said thermostat selector switch to indicate if heating or cooling is desired, a fan selector switch having automatic and ON positions and being connected to said secondary winding, contactor relay means energized by said secondary winding via said thermostat and said thermostat selector switch if both call for cooling thereby connecting a compressor means and condenser fan means to said line voltage, heating control means connected to said thermostat selector switch to operate furnace means for heating if said thermostat and said thermostat selector switch call for heating, evaporator fan relay means connected to said fan selector switch and said secondary winding, the improvement comprising:
economizer control relay coil means connected to said secondary winding and said thermostat for energization if said thermostat and said thermostat selector switch both call for cooling, said economizer control relay coil means switching said blower motor from low speed to high speed if said fan selector switch is in said ON position.

2. The home type heating and cooling system as given in claim 1 wherein said evaporator fan relay means includes a first normally closed contact connecting through a furnace thermostat to a low speed terminal of said blower motor, and a first normally open contact operatively connected via intermediate contacts of said economizer control relay coil to both said low speed terminal and a high speed terminal of said blower motor, said first normally closed contact and said first normally open contact being connected to a second side of said line voltage.

3. The home type heating and cooling system as given in claim 2 wherein said intermediate contacts of said economizer control relay coil include a second normally open contact connected to said high speed terminal of said blower motor, and a second normally closed contact connected to said low speed terminal and between said first normally open contact and said second normally open contact.

4. A method of controlling a heating and cooling system for regulating temperature in an enclosed space consisting of the following steps:
first setting a thermostat selector switch to heat and a fan selector switch to automatic during the heating season;
first energization of a heating control unit upon a thermostat closing indicating heat is required thereby beginning operation of a furnace to heat said enclosed space;
closing a furnace fan switch to operate blower motor at low speed to circulate heat from said furnace to said enclosed space;
second setting said thermostat selection switch to cool and said fan selector switch to ON during the cooling season;
second energization of an evaporator fan relay means to continuously operate said blower motor;
third energization of an economizer control relay means and a contactor relay means upon said thermostat closing indicating cooling is required, said contactor relay means connecting compressor means and condenser fan motor means to line voltage, said economizer control relay means operating said blower motor at a high speed during said third energization and at said low speed during remaining times of said cooling season.

5. A method of converting a home heating and cooling system for regulating temperature inside a home; said home heating and cooling system having a heating furnace, compressor and condenser fan operated by a thermostat selector switch and thermostat means; multiple speed blower operated by a fan selector switch; evaporator switching means operating said multiple speed blower at a high speed if said fan selector switch is in an ON position, or if said thermostat selector switch and thermostat means both call for cooling, and at a low speed if said fan selector switch is in an automatic position and said thermostat selector switch and thermostat means calls for heating and said furnace fan switch is closed, said converting consisting of the following steps:
disconnecting said evaporator switching means from said multiple speed blower;
connecting economizer relay coil means between a cooling terminal of said thermostat means indicating cooling is required and to a voltage source;
inserting relay contact means of said economizer relay coil means between said evaporator switching means and high and low speed terminals of said multiple speed blower;
said relay contact means operating said multiple speed blower during the cooling season at a high speed when cooling is required and said compressor is operating, otherwise at a low speed.

* * * * *